March 29, 1966     N. S. NICHOLS     3,243,173
APPARATUS FOR PRODUCING REFRACTORY METALS
Filed June 22, 1962
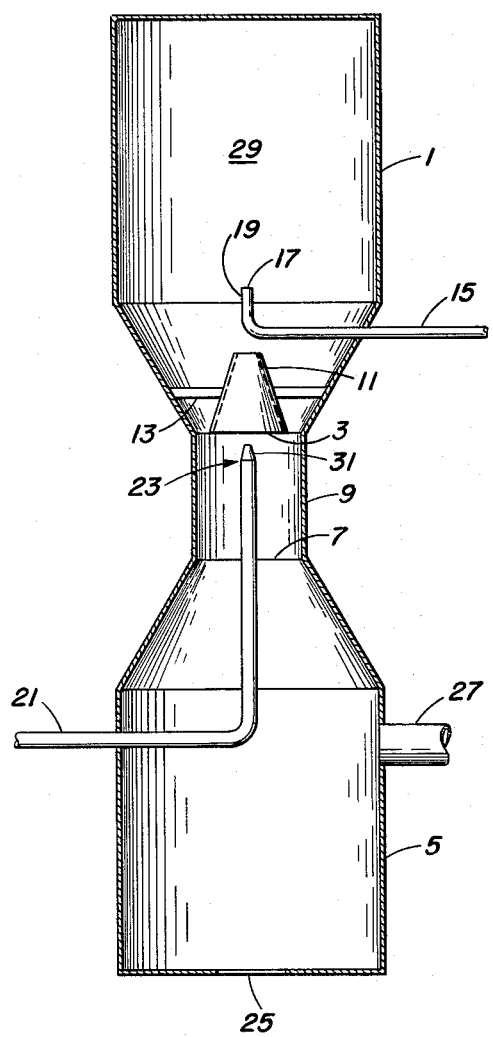
INVENTOR.
Newlin S. Nichols
BY
ATTORNEY United States Patent Office 3,243,173
Patented Mar. 29, 1966

3,243,173
APPARATUS FOR PRODUCING REFRACTORY METALS
Newlin S. Nichols, Dearborn, Mich., assignor to Wyandotte Chemicals Corporation, Wyandotte, Mich., a corporation of Michigan
Filed June 22, 1962, Ser. No. 204,403
6 Claims. (Cl. 266—24)

This invention relates to apparatus and a method for preparing refractory metals. More particularly this invention relates to apparatus and a method for preparing pure particulate refractory metals. A typical application is the preparation of niobium metal by the vapor phase hydrogen reduction of niobium pentachloride.

The vapor phase reduction of refractory metal halides such as niobium pentachloride with a reducing gas such as hydrogen is well known in the art. In carrying out this reaction the two gases are mixed at a high temperature which results in the formation of refractory metal particles. These particles are very fine and resemble a powder. Unfortunately the creation of fine particles constitutes a major problem associated with the preparation of refractory metals via the vapor phase refractory metal halide reduction method. The fine particle size material causes losses of the pure metal from the system and creates difficulties in recovery and handling.

However, another serious problem is also created by the fine particle size of the metal. The large surface are of the particles due to the fine particle size increases the tendency of the metal to oxidize when exposed to the atmosphere. Thus, oxygen-contaminated metal results. Oxygen present in a refractory metal causes hardening and embrittlement of the metal resulting in metal that is difficult to fabricate. Therefore it is extremely important that oxygen contamination of the metal be reduced to a minimum.

In view of the foregoing it is apparent that the production of refractory metals having greater particle size would eliminate or reduce these problems and would be an improvement in the art.

Therefore an object of this invention is to provide apparatus and a method for preparing refractory metals of increased particle size.

Another object of this invention is to provide apparatus and a method for preparing refractory metals of increased particle size based on the vapor phase reduction of a refractory metal halide.

These and other objects that may appear hereinafter as this specification proceeds are achieved by this invention.

In accordance with this invention a novel method and apparatus for preparing refractory metals by the vapor phase reduction of refractory metal halides has been provided. The method and apparatus permit the production of metal particles of substantial particles size by separating the large particles from the fine particles produced by the reduction reaction and recycling the fine particles through the reaction zone until the particles attain sufficient size. As the fine particles pass through the reaction bone, metal, as it forms, deposits on the surface of the particles. Thus the particles grow. The metal losses from the system are substantially reduced and the refractory metal particles produced are convenient to handle and utilize. The particles also tend to oxidize less because of their small surface area.

A more complete understanding of the invention will be obtained upon study of the accompanying drawing which is a cross-sectional front view of the apparatus.

Referring now to the drawing, there is shown an upper chamber 1 having a converging conical bottom forming an opening 3 and a lower chamber 5 having a converging conical top forming an opening 7. In a preferred embodiment of this invention the two chambers are cylindrical. The upper and lower chambers are connected by a conduit means 9 for establishing communication between the openings of the chambers. Conduit means 9 is preferably a vertical tube.

A hollow truncated cone 11 is mounted axially by means of mounts 13 within the converging conical bottom of chamber 1 and spaced from the walls thereof, and having its base directed downwardly. The base of hollow truncated cone 11, in a preferred embodiment of this invention, is positioned close to opening 3 in the bottom of upper chamber 1.

For the introduction of refractory metal halide gas there is provided a reactant gas inlet 15 having an opening 17 spaced above the top of hollow truncated cone 11. In the preferred embodiment of this invention, reactant gas inlet 15 has an upwardly bent vertical section 19 which terminate with opening 17 and which is substantially in alignment with the center axis of hollow truncated cone 11. In another alternative, gas inlet 15 is a substantially horizontal open-ended tube having an opening 17 above hollow truncated cone 11.

Reducing gas inlet 21 is provided for the introduction of the reducing gas and is provided with a reducing gas discharge opening 23 spaced below the base of cone 11 and positioned to direct a high velocity gas stream into the center of hollow truncated cone 11. Preferably a nozzle 31, such as a steam jet type nozzle, is attached to gas discharge opening 23 and is positioned to direct the reducing gas at a high velocity upwardly into the center of cone 11. However, the apparatus is operable without nozzle 31.

Withdrawal means 25 may be a slide for batch operations or screw conveyor for continuous operation or any other sealed means for removing particles known in the art. Off gas outlet 27 removes the gases from the apparatus and is positioned in lower chamber 5. Preferably off gas outlet 27 is a tube or pipe located approximately midway between the top and bottom of lower chamber 5.

Accordingly the gas inlets 15 and 21 and outlet means 27 are tubes or pipes of sufficient diameter to handle the gas streams. The diameter in each case is dictated by the production rate utilized.

*Operation*

The process of this invention is useful for the preparation of refractory metals, for example niobium, tantalum, tungsten, molybdenum, and the like.

A reducing gas is preheated to a temperature preferably at or near the reaction temperature and introduced into the apparatus via reducing gas inlet 21 from a reducing gas introduction point upwardly into a reaction zone 29 within upper chamber 1 at a velocity of about 100 to 200 ft./sec. Since the reaction temperature necessary for the formation of each particular refractory metal varies, the reducing gas temperature will vary accordingly depending upon the particular refractory metal being prepared. Preferably the apparatus should be equipped with a heating means, not shown, to maintain the internal temperature at the required reaction temperature. Representative of the reducing gases ordinarily employed in the vapor phase reduction of refractory metal halides are hydrogen and zinc vapor.

A refractory metal halide gas (reactant gas) is also preheated to a temperature preferably at or near the reaction temperature and is then introduced into the system via reactant gas inlet 15. For example, niobium pentachloride may be the refractory metal halide gas. However it should be noted that the refractory metal halide gas stream may include a portion of the reducing gas. Accordingly, up to about one-third of the total reducing gas may be introduced into the apparatus with the reactant gas via gas inlet 15. In this situation, however, the mixture of the two gases is preheated to a temperature less than the reaction temperature of the refractory metal halide and the reducing gas to minimize the formation of niobium metal in reactant gas inlet 15. Thus the temperature of the gas mixture should be less than 700° C. but at least about 275° C.

The relative mol ratios of reducing gas to metal halide gas for example where hydrogen and niobium pentachloride are utilized is maintained within the range of about 20 to 200 mols of hydrogen per mol of niobium pentachloride.

The two gases mix in the reaction zone 29 at a point above the reducing gas discharge opening 23 and fine particles of the refractory metal are formed. The reaction should be carried out at a temperature of about 700 to 1200° C. The particles formed fall and pass between the walls of upper chamber 1 and hollow truncated cone 11 to a point just below the base of said cone, where a separation is obtained of the particles into a large particle fraction and a fine particle fraction. After the separation, the large particles drop into the lower chamber 5 while the fine particles, along with some of the gases, are drawn into the reducing gas stream and carried back to upper chamber 1. Thus the fine particles are continuously circulated back into reaction zone 29 until they reach sufficient size to drop into lower chamber 5.

The gases are exhausted from the apparatus through off gas outlet 27, and the pure metal particles are removed from the bottom of the apparatus either continuously or at the end of each run.

However, the method of this invention for preparing refractory metals is not limited to the particular apparatus herein described. The separation step in the method may be accomplished externally to the apparatus instead of internally as already described.

The mixture of gas and refractory metal particles obtained after the reduction of the refractory metal halide may be removed from reaction zone 29 and the metal particles separated from the gas. For example, the separation might be accomplished in a cyclone separator. The separated metal particles are then screened and the undersize particles returned to the apparatus. This may be accomplished in either of two ways. The undersize particles may be introduced into reducing gas inlet 21 and thereby carried into the apparatus in the reducing gas or the particles may be introduced directly into the apparatus by means of a screw feeder at a point above reducing gas discharge opening 23.

*Example I*

In the apparatus illustrated in FIG. 1 having an external heating means, preheated hydrogen at a temperature of 875° C. is introduced through reducing gas inlet 21 at a velocity of 150 ft./sec. Preheated niobium pentachloride vapor is introduced into the upper chamber 1 via reactant gas inlet 15 at a temperature of about 875° C. The mol ratio of hydrogen to niobium pentachloride during the run is maintained at 75 to 1.

The two gases mix in the reaction zone 29 and the particles of niobium metal which form fall to a point below the cone 11 and are carried by the hydrogen stream back to the reaction zone 29. After several recycles some particles attain sufficient size to fall to the bottom of the lower chamber 5.

After the run is completed the particles are removed from the lower chamber via withdrawal means 25. The recovered niobium metal particles are of very high purity and of sufficient particle size to be retained on a 200-mesh screen.

*Example II*

In the apparatus illustrated in FIG. 1 having an external heating means preheated hydrogen at a temperature of 875° C. is introduced through reducing gas inlet 21 at a velocity of 200 ft./sec. A mixture of preheated niobium pentachloride vapor and hydrogen (not more than one-third of total $H_2$ fed) at about 275° C. is introduced into the upper chamber 1 via reactant gas inlet 15. The mol ratio of niobium pentachloride during the run is maintained at 75 to 1.

The two gases mix in the reaction zone 29 and the particles of niobium metal which form fall to a point below the cone 11 and are carried by the hydrogen stream back to the reaction zone 29. After several recycles some particles attain sufficient size to fall to the bottom of the lower chamber 5.

After the run is completed the particles are removed from the lower chamber via withdrawal means 25. The recovered niobium particles are of very high purity and of sufficient particle size to be retained on a 200-mesh screen.

Thus a novel apparatus and method for preparing pure refractory metals have been invented. It will be apparent to those skilled in the art that various modifications of this invention can be made upon studying the accompanying disclosure. Such modifications are considered to be clearly within the spirit and scope of this invention.

I claim:
1. Apparatus for production of refractory metals which comprises:
   A. an enclosed upper chamber having a converging conical bottom forming an opening,
   B. an enclosed lower chamber having a converging conical top forming an opening,
   C. a conduit means for establishing communication between the openings of said upper and lower chambers,
   D. a hollow truncated cone mounted axially within said converging conical bottom of said upper chamber and spaced from the walls thereof wherein the base of said cone is downwardly disposed,
   E. a reactant gas inlet means for introducing a reactant gas into said upper chamber having an opening spaced above the top of said hollow truncated cone,
   F. a reducing gas inlet means having an opening spaced below the base of said hollow truncated cone and positioned to direct a reducing gas at a high velocity upwardly into the center of said hollow truncated cone,
   G. means for withdrawal of gas from said lower chamber, and
   H. means for withdrawal of metal particles from the bottom of said lower chamber.

2. Apparatus for production of refractory metals which comprises:
   A. an enclosed upper chamber having a converging conical bottom forming an opening,
   B. an enclosed lower chamber having a converging conical top forming an opening,
   C. a conduit means for establishing communication between the openings of said upper and lower chambers,
   D. a hollow truncated cone mounted axially within said converging conical bottom of said upper chamber and spaced from the walls thereof wherein the base of said cone is downwardly disposed,
   E. a reactant gas inlet means for introducing a reactant gas into said upper chamber having a vertical section open at its end substantially in alignment with the center axis of said hollow cone,
   F. a reducing gas inlet means having an opening spaced below the base of said hollow truncated cone and positioned to direct a reducing gas at a high velocity upwardly into the center of said hollow truncated cone,
   G. means for withdrawal of gas from said lower chamber, and H. means for withdrawal of metal particles from the bottom of said lower chamber.

3. Apparatus for production of refractory metals which comprises:
A. an enclosed upper chamber having a converging conical bottom forming an opening,
B. an enclosed lower chamber having a converging conical top forming an opening,
C. a conduit means for establishing communication between the openings of said upper and lower chambers,
D. a hollow truncated cone mounted axially within said converging conical bottom of said upper chamber and spaced from the walls thereof wherein the base of said cone is downwardly disposed,
E. a reactant gas inlet means for introducing a reactant gas into said upper chamber having an opening spaced above the top of said hollow truncated cone,
F. a reducing gas inlet means provided with a nozzle wherein the said nozzle is spaced below the base of said hollow truncated cone and positioned to direct a reducing gas at a high velocity upwardly into the center of said hollow truncated cone,
G. means for withdrawal of gas from said lower chamber, and
H. means for withdrawal of metal particles from the bottom of said lower chamber.

4. Apparatus for production of refractory metals which comprises:
A. an enclosed upper chamber having a converging conical bottom forming an opening,
B. an enclosed lower chamber having a converging conical top forming an opening,
C. a conduit means for establishing communication between the openings of said upper and lower chambers,
D. a hollow truncated cone mounted axially within said converging conical bottom of said upper chamber and spaced from the walls thereof wherein the base of said cone is downwardly disposed,
E. a reactant gas inlet means for introducing a reactant gas into said upper chamber having a vertical section open at its end substantially in alignment with the center axis of said hollow cone,
F. a reducing gas inlet means provided with a nozzle wherein the said nozzle is spaced below the base of said hollow truncated cone and positioned to direct a reducing gas at a high velocity upwardly into the center of said hollow truncated cone,
G. means for withdrawal of gas from said lower chamber, and
H. means for withdrawal of metal particles from the bottom of said lower chamber.

5. Apparatus for production of refractory metals which comprises:
A. an enclosed cylindrical upper chamber having a converging conical bottom forming an opening,
B. an enclosed cylindrical lower chamber having a converging conical top forming an opening,
C. a conduit means for establishing communication between the openings of said upper and lower chambers,
D. a hollow truncated cone mounted axially within said converging conical bottom of said upper chamber and spaced from the walls thereof wherein the base of said cone is downwardly disposed,
E. a reactant gas inlet means for introducing a reactant gas into said upper chamber having an opening spaced above the top of said hollow truncated cone,
F. a reducing gas inlet means having an opening spaced below the base of said hollow truncated cone and positioned to direct a reducing gas at a high velocity upwardly into the center of said hollow truncated cone,
G. means for withdrawal of gas from said lower chamber, and
H. means for withdrawal of metal from the bottom of said lower chamber.

6. Apparatus for production of refractory metals which comprises:
A. an enclosed cylindrical upper chamber having a converging conical bottom forming an opening,
B. an enclosed cylindrical lower chamber having a converging conical top forming an opening,
C. a conduit means for establishing communication between the openings of said upper and lower chambers,
D. a hollow truncated cone mounted axially within said converging conical bottom of said upper chamber and spaced from the walls thereof wherein the base of said cone is downwardly disposed,
E. a reactant gas inlet means for introducing a reactant gas into said upper chamber having a vertical section open at its end substantially in alignment with the center axis of said hollow cone,
F. a reducing gas inlet means provided with a nozzle wherein the said nozzle is spaced below the base of said hollow truncated cone and positioned to direct a reducing gas at a high velocity upwardly into the center of said hollow truncated cone,
G. means for withdrawal of gas from said lower chamber, and
H. means for withdrawal of metal particles from the bottom of said lower chamber.

References Cited by the Examiner

UNITED STATES PATENTS

| | | | |
|---|---|---|---|
| 2,689,973 | 9/1954 | Lee et al. | 75—26 |
| 2,847,295 | 8/1958 | Bretschneider et al. | 266—24 |
| 2,969,969 | 1/1961 | Gummeson | 266—24 |
| 2,993,779 | 7/1961 | Basen et al. | 266—24 |
| 2,997,385 | 8/1961 | Winter | 266—24 |
| 3,011,772 | 12/1961 | Rouaux | 266—24 |
| 3,012,876 | 12/1961 | Eaton et al. | 75—26 |
| 3,020,148 | 2/1962 | Jenkins et al. | 75—26 |

JOHN F. CAMPBELL, *Primary Examiner.*

WHITMORE A. WILTZ, D. L. RECK, R. W. GASS, M. L. FAIGUS, *Examiners.*